United States Patent [19]
Whitfield et al.

[11] Patent Number: 5,827,341
[45] Date of Patent: Oct. 27, 1998

[54] METHOD AND APPARATUS FOR MAKING GLASS

[75] Inventors: Peter James Whitfield, St Helens; Robert Emmett Trevelyan, Wigan; Andrew Michael Keeley, Liverpool; David Martlew, St Helens, all of United Kingdom

[73] Assignee: Pilkington plc, St. Helens, United Kingdom

[21] Appl. No.: 738,053

[22] Filed: Oct. 25, 1996

[30] Foreign Application Priority Data

Oct. 28, 1995 [GB] United Kingdom ................... 9522123

[51] Int. Cl.$^6$ .................................. C03B 5/16; C03B 5/18
[52] U.S. Cl. ..................... 65/134.1; 65/134.9; 65/135.1; 65/135.2; 65/135.3; 65/135.4; 65/178; 65/179; 65/335; 65/346; 65/347; 65/356
[58] Field of Search .................. 65/134.1, 134.9, 65/135.1, 135.3, 135.2, 135.4, 178, 179, 346, 335, 347, 355, 356, 99.1, 99.2, 99.4, 182.1

[56] References Cited

U.S. PATENT DOCUMENTS

| | | | |
|---|---|---|---|
| 1,898,039 | 2/1933 | Eckert | 65/135.3 |
| 2,124,092 | 7/1938 | Wadsworth | 65/178 |
| 3,997,315 | 12/1976 | Rhodes et al. | 65/135.3 |
| 4,046,546 | 9/1977 | Hynd | 65/135.3 |
| 4,055,408 | 10/1977 | Novak et al. | 65/346 |
| 4,082,528 | 4/1978 | Lythgoe et al. | 65/135.1 |
| 4,200,448 | 4/1980 | Dickinson | 65/135.3 |
| 4,339,261 | 7/1982 | Walton et al. | 65/178 |
| 4,517,000 | 5/1985 | Burget et al. | 65/135.1 |
| 4,744,809 | 5/1988 | Pecoraro et al. | 65/135.1 |
| 5,194,081 | 3/1993 | Trevelyan et al. | 65/135.1 |
| 5,433,765 | 7/1995 | Muniz et al. | 65/135.1 |

*Primary Examiner*—Steven P. Griffin
*Attorney, Agent, or Firm*—Howrey & Simon

[57] ABSTRACT

A method and apparatus for making float glass, wherein the glass is stirred in the conditioning zone adjacent the entrance to the float canal so as to attenuate the glass across the entire width of the float canal.

20 Claims, 2 Drawing Sheets

METHOD AND APPARATUS FOR MAKING GLASS

FIELD OF THE INVENTION

The present invention relates to a method and apparatus for making molten glass. More particularly, the present invention relates to a method and apparatus for making molten glass by means of which faults in glass entering a float tank are obviated or at least minimized.

BACKGROUND OF THE INVENTION AND PRIOR ART DISCUSSION

A conventional float furnace comprises a melting zone, a refining zone and a conditioning zone. In the melting zone, as the name implies, the components used for making the glass are melted. In the refining zone, the bubbles which are present in the molten glass are removed. From the refining zone, the molten glass passes into a conditioning zone where it is cooled before it enters a float canal on its way into a float bath.

Although each of the material components which are melted to form the glass is nominally homogeneous, differences in grain size do exist. Moreover, the raw materials have different grain sizes from one another. Although the batches are mixed, such mixing is never perfect. Moreover, depending on the conditions under which the materials have been stored, segregation and/or reaction of the grains may occur. It is known that these differences contribute to inhomogeneity in the finished glass.

The components are mixed together and continuously fed into the melting zone where, initially, the mixture forms a blanket floating on already melted glass. Mixing of granular solids is never perfect and if the scale of examination is sufficiently small distinct differences in mean chemical composition may be found from place to place within the mixture. Further inhomogeneity may arise as the mixture melts. For example, in most float glasses, alkali-rich liquid phases run down the inclined upper surfaces of the floating blanket. Similarly, float glasses are often made in regenerative furnaces and inhomogeneities may occur as the firing changes over from side to side. Other possible sources of inhomogeneity are refractory corrosion, the dissolution of furnace atmosphere in the glass and the selective loss by vaporisation of some of the glass constituents.

In the conditioning zone, the glass is cooled and further problems may arise due to the thermal convection currents produced by such cooling. Cooling occurs when the glass meets the side walls and bottom of the conditioning zone, but controllable cooling is usually effected in a downward direction, that is to say, the upper surface of the molten glass is cooled to the desired extent, usually by air. The convection currents which are set up usually result in convoluted flow patterns affecting the transit of a significant proportion of the glass through the conditioning zone. As a result, glass which has spent a considerable time passing through these complex flow paths will be brought together in the product with glass which has experienced a relatively rapid transit, thus exacerbating any inhomogeneity which exists.

All of these sources of inhomogeneity can give rise to discrete faults and/or ream faults in the finished glass. Ream, as is well known, is associated with the optical effect produced in glass when portions of the glass adjacent one another have differing optical densities or refractive indices.

Long residence times can give rise to major problems if the furnace is to be switched from making one type of glass, for example, a tinted glass, to a different type of glass such as clear glass. In such example, some portions of the tinted glass take a very long time to be flushed out of the conditioning zone. It will be readily appreciated that the furnace must be substantially free from residues of the tinted glass before the standard of the clear glass being produced can reach a commercially acceptable level. This is because streaks or bands of the tinted glass manifest themselves in the clear glass and the latter will not be of acceptable quality until all of these streaks or bands have disappeared.

OBJECTS OF THE INVENTION

The present invention seeks to provide a method and apparatus for making glass whereby the above problems are obviated or, at least, minimized. In a specific aspect, the present invention seeks to provide a method and apparatus which enables a changeover between making different types of glass to be effected much more rapidly so that a commercially acceptable grade of the new glass is achieved without undue, and therefore, expensive delay.

SUMMARY OF THE INVENTION

According to the present invention, there is provided an apparatus for making glass in a float furnace comprising a melting zone, a refining zone and a conditioning zone sequentially traversed by the molten glass, and a float canal receiving molten glass from the conditioning zone, stirring means being so located as, in use, to attenuate the molten glass across the full width of the exit from the conditioning zone into the float canal.

The concept of stirring the glass immediately upstream of the entrance to the float canal is, we believe, completely new. It has generally been perceived that the molten glass is, in this region, too cold to be stirred adequately. Furthermore, conventional wisdom in the glass industry has been that stirring should be effected in confined areas of the furnace such as canals. The main shortcomings of stirring in canals are that (a) an unacceptable feature results, (b) the problem of wear of the material from which the canal is made and (c) the introduction of discrete faults. These are somewhat interlinked.

The high temperatures generally involved in glassmaking furnaces and the corrosive nature of the molten glass make the choice of materials for constructing stirrers important. Stirrers are conventionally made from one of three different types of material. These are a) refractory materials such as sillimanite, b) refractory metals such as platinum or molybdenum or c) mild steel piping. Each of these materials has its own associated problems.

Refractory materials tend to dissolve in the glass and produce refractive index variations and associated faults. They also tend to shed "stones", that is to say, discrete solid faults, into the glass. Finally, they have a tendency, after protracted use, to break and drop into the glass from which, of course, they are extremely difficult to recover. The major disadvantage of using refractory metals is, of course, their cost. However, they may also give rise to bubble formation by acting as electrodes for electrolysis reactions.

Steels, such as mild steel, are clearly the preferred materials by virtue of it being inexpensive, readily available and workable. However, they have a major disadvantage which is that they have a low melting point. Such stirrers must, therefore, be cooled and the most obvious method of cooling is to use water. Conventional wisdom, however, decrees that water cooling of stirrers cannot be effected in canals. Water cooling lowers the temperature of the glass even more and current thought is that this will introduce further defects into the glass. Moreover, if the production line breaks down, the stirrers will freeze the glass in the canal. This, in turn, may cause physical damage to the canal itself.

We have surprisingly found that, by stirring immediately upstream of the exit from the conditioning zone into the float canal and by ensuring that the glass is fully attenuated before it enters the float canal, the above-mentioned problems either do not arise or are greatly minimised.

Preferably, said stirring means comprises at least one pair of stirrers. Advantageously, each stirrer comprises a shaft which, in use, projects substantially vertically downwardly into the molten glass, said shaft carrying, at its lower end, a stirring device coplanar with the axis of the shaft, the stirring device having a major axis and a minor axis of differing dimensions and a generally rectangular configuration.

Desirably, in such a case, the stirring device comprises a pair of paddles disposed at an angle of substantially 180° to one another and at 90° to the axis of the shaft, the stirrers in each pair being offset at an angle of substantially 90° to one another and being rotated in opposed directions.

In a particularly preferred embodiment of the present invention, the stirrer paddles are, in use, totally immersed in the molten glass.

Desirably, the stirring means are provided with cooling means. In such an arrangement, it is particularly preferred if the stirrers are made of mild steel piping and the cooling means comprise a water cooling arrangement 20.

In a second aspect of the present invention, there is provided a method of making glass in a flat or float glass furnace comprising the steps of melting a batch of glass components in a melting zone of the furnace, refining the molten glass in a refining zone to remove bubbles therefrom, causing the molten glass to pass from the refining zone into a conditioning zone, cooling the molten glass in the conditioning zone and causing said conditioned glass to enter a float canal wherein the glass is subjected to stirring in the region of the exit from the conditioning zone into the float canals so that the glass is fully attenuated as it enters the float canal.

Preferably, said further stirring is effected by providing at least one pair of stirrers and rotating paired stirrers in opposite rotational senses.

Advantageously, the paired stirrers are identical to one another and each comprises a shaft extending substantially vertically downward, in use, into the molten glass, each said shaft carrying, at its lower end, structures which will in use form a substantially rectangular stirring element or paddle coplanar with the axis of the shaft, these stirrers to be used in pairs set so that their paddles are rotationally out of phase by substantially 90° and are being rotated in opposite senses.

BRIEF DESCRIPTION OF THE DRAWINGS

The present invention will be further described, by way of example only, with reference to the accompanying drawings, in which.

DESCRIPTION OF PREFERRED EMBODIMENTS

Figure 1:
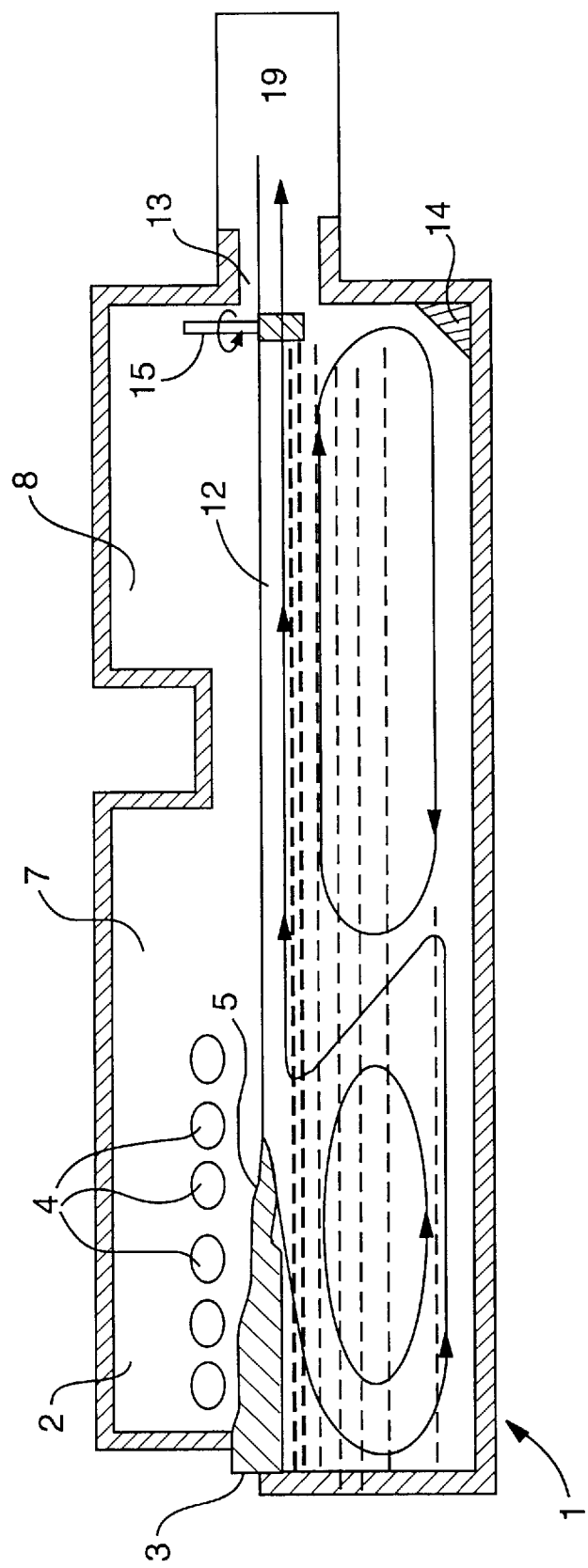
FIG. 1 is a schematic longitudinal section through a glass making furnace in accordance with the present invention.

In FIG. 1, there is shown a glass making furnace generally designated 1. The furnace comprises a melting zone 2. A mixture of raw materials which are melted to form the glass is designated 3. In the embodiment shown, the components are melted in a manner known as transverse firing through ports 4. As will be seen in FIG. 1, as the materials melt, they form a gradually thinning blanket 5 on the surface of the molten glass 6.

The molten glass then passes into a refining zone 7. This is the hottest part of the furnace and, in such region, bubbles formed in the molten glass in the melting zone 2 are removed or, at least, the number thereof is minimised. Immediately downstream, in the direction of flow of the molten glass, is a conditioning zone 8 in which the refined glass is cooled.

For a variety of reasons, including the throughput of the glass and thermal convection currents, there is a certain amount of recirculation of the glass within the melting zone 2. However, as the glass passes into the refining zone 7, there is basically a split into direct and recirculating flow features can be clearly seen. The direct flow feature stays adjacent the surface of the molten glass in the refining zone and flows through the conditioning zone as the portion adjacent the upper surface of the molten glass 6. This direct flow 12 then enters a float canal 13 from whence it passes into a float bath (not shown) contained in float tank 19.

Due to thermal convection currents, there is also a recirculating flow pattern. One problem that does arise in such an arrangement is that there are "stagnant" areas where the molten glass tends to become relatively cold and viscous; once glass has entered such a zone it tends to remain there for long periods. One such region is adjacent the front end wall 14 of the conditioning zone. It is the retention of glass in these areas which causes an excessive change-over time when, for example, the furnace 1 is switched from making tinted glass to clear glass. The glass circulating in the conditioning zone 8 is extracted therefrom fairly rapidly but the glass which has collected in the "stagnant" areas tends to remain there for long periods and is only removed with difficulty.

As is conventional, the conditioning zone 8 is cooled. Heat is removed in that zone from the surface of the glass and through the base and side walls of the zone. Most of the heat is, however, extracted from the surface of the glass. To achieve this, it is customary to have an air flow over the upper surface of the glass. This, however, presents a dichotemy. The top surface cooling produces in the glass adverse thermal circulations, known as thermal inversions. In other words, colder denser glass near the surface is supported by hotter, less dense glass below and under some circumstances, this may cause local glass circulation patterns which lead to unacceptable stripes in the finished glass. Accordingly, the amount of above-glass cooling must be limited. Conventionally this problem is overcome by providing a sufficiently large conditioning zone so that appropriate cooling rates per unit surface area are achieved. At this point, it should be remembered that it is necessary to ensure that the glass is cooled because there is an optimum temperature at which the glass must enter the float canal. Unfortunately, however, the provision of a large conditioning zone 8 greatly increases the capital costs of the furnace arrangement and substantially increases the time taken to flush out the furnace thoroughly during tint changes.

Figure 2:
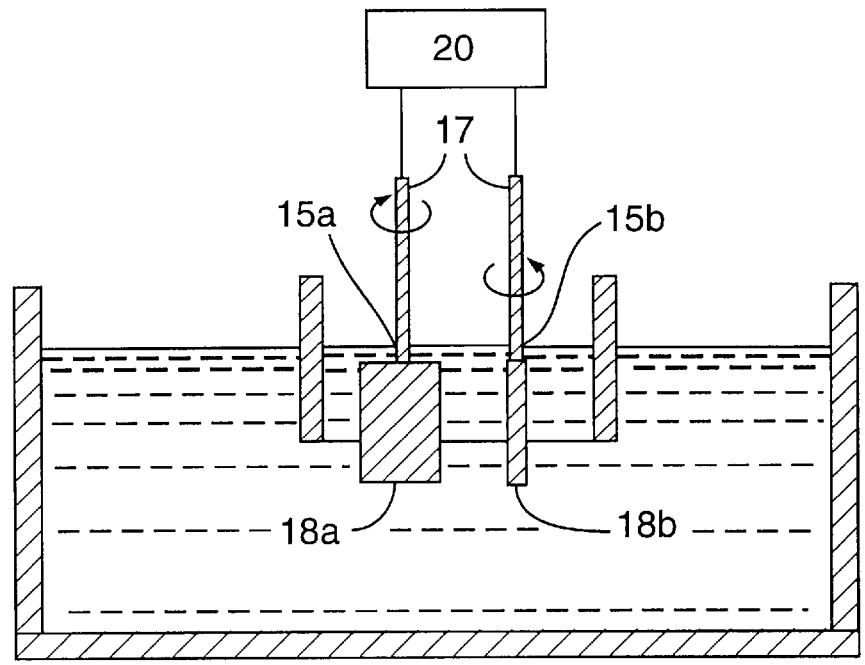
FIG. 2 is an elevational view, on an enlarged scale, of stirrers forming part of a furnace in accordance with the present invention.

There is also provided, in the present invention, at least one pair of stirrers 15, best seen in FIG. 2, which are located just upstream of the entrance 16 to the float canal. Only one pair of stirrers 15 is shown in FIG. 2 for the sake of clarity. The individual stirrers 15a and 15b are identical to one another. Each comprises a shaft 17, including opposed first and second end portions, which, in use, projects substantially vertically downwards into the molten glass. The shafts are driven by suitable drive means, not shown. At its lower, free end each shaft carries a pair of paddles 18a and 18b. The paddles 18a and 18b extend at substantially 90° to the axis of the shaft 17. The two paddles are disposed at an angle of substantially 180° to one another. From FIG. 2, it will be observed that the two stirrers are set so that their paddles 18a and 18b are rotationally out of phase by substantially 90° and are rotated at the same speed as one another, which speed lies within the range of 2–20 rpm, but in opposite senses.

Figure 3:
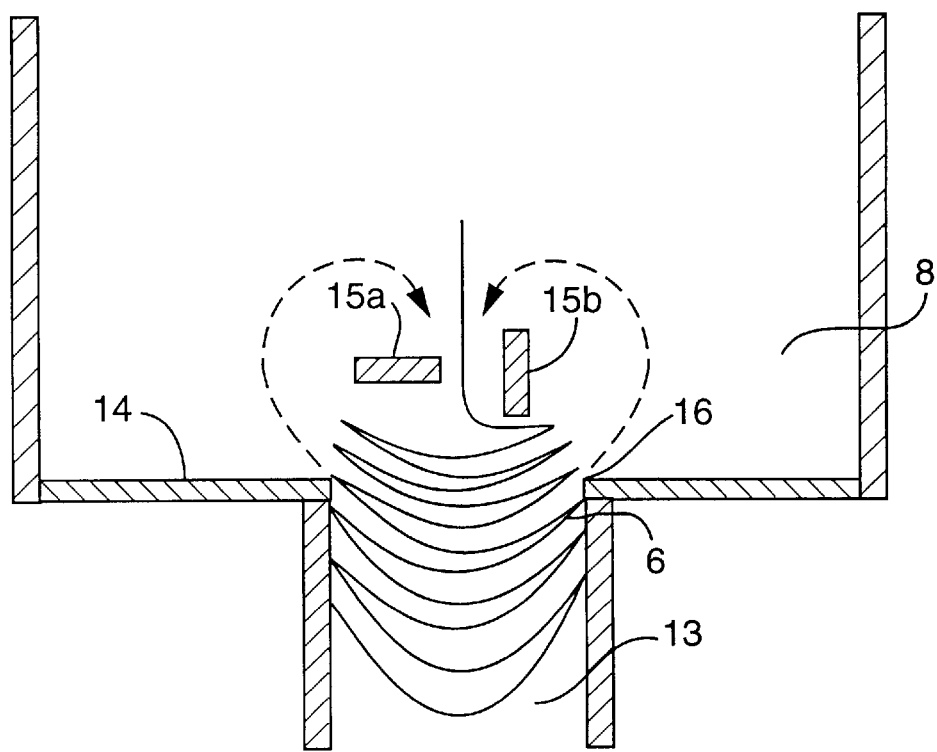
FIG. 3 is a plan view, showing the attenuation of glass produced by the stirrers shown in FIG. 2.

Such stirring causes the effect shown in FIG. 3. This Figure shows diagrammatically the locus of a minute portion of glass under the action of the stirrers. As will readily be seen, the glass portion is caused to move from side to side across a width at least equal to that of the canal whilst in the conditioning zone 8. Such movement is an essential feature of the homogenization process; all of the molten glass is attenuated and atypical regions will become interleaved with the remainder of the glass so that the optical distortion produced by them is minimised. Depending on the width of the conditioning zone 8 and/or the size of the stirrers 15a, 15b, the glass 6 may either be satisfactorily attenuated before it enters the float canal or such attenuation may be achieved at the canal entrance. In either case, the aim is the same: to prevent any glass which has not been stirred from by-passing the stirrers 15a, 15b and entering the canal along the side-walls and end walls of the conditioner. As will also be seen in FIG. 3, any glass which follows this path to the canal entrance 16 is collected by the glass which has been subjected to the action of the stirrers 15a, 15b but has not passed into the canal and is returned to the upstream side of the stirrers 15a, 15b.

The stirrers 15a, 15b stir out any optical defects which might otherwise be formed in the region of the canal entrance 16. Such stirring-out of the defects allow higher surface cooling rates to be used in the conditioner. In existing float glass furnaces where output is limited by the need to avoid these problems, this means that higher glass loads can be produced. Alternatively, in new furnaces, it will be possible to make the conditioning zone 8 considerably smaller in order to obtain glass at the correct temperature to enter the float canal. This, of course, represents a substantial saving in capital costs.

Another benefit of stirring in the region of the entrance to the float canal is that the stirrers 15a, 15b may be water-cooled. To achieve the same temperature of the glass entering the float canal, the conditioning zone can then be operated at a higher temperature. In other words, less cooling air needs to be supplied to the surface of the molten glass 6 in the portion of the conditioning zone 8 upstream of the stirrers 15a, 15b. When the conditioning zone 8 is operating generally at a higher temperature, the molten glass is, of course, more fluid. This means that the "stagnant" regions of glass adjacent the front end wall of the conditioning zone 8 become smaller and also that the glass in such regions may be flushed out more easily when there is a changeover of the furnace 1 from making one type of glass to another. A still further advantage presented by the present invention is that devitrification is far less likely to occur.

We claim:

1. An apparatus for making glass comprising feed means for supplying a glass-making composition; melting zone receiving said composition from said feed means for melting said composition to form molten glass, said melting zone including an outlet for said molten glass; refining zone receiving said molten glass from said outlet of said melting zone for refining said molten glass to remove inhomogeneities therefrom to form refined molten glass, said refining zone including an outlet for said refined molten glass; conditioning zone receiving said refined molten glass from said refining zone for cooling said refined molten glass to form conditioned glass, said conditioning zone including an outlet for an upper portion of said conditioned glass; a float canal, having a narrower width than said conditioning zone and a bottom at a depth generally corresponding to said upper portion of said conditioned glass, receiving said conditioned glass from said outlet of said conditioning zone, said float canal including an outlet for said received glass; and a float tank receiving said glass from said outlet of said float canal; and stirring means disposed in said conditioning zone adjacent said outlet of said conditioning zone.

2. An apparatus as recited in claim 1 wherein said stirring means comprises at least one pair of stirrers.

3. An apparatus as recited in claim 2 wherein said stirrers in each said at least one pair are substantially identical to one another.

4. An apparatus as recited in claim 1 wherein said stirring means comprises at least one pair of stirrers, each said stirrer in each said at least one pair comprises a shaft extending, in use, substantially vertically downwardly into said molten glass, said shaft including an axis and opposed first and second end portions, at least one stirrer member carried by said second end portion of said shaft and coplanar with the axis of said shaft; said at least one stirrer member having a generally rectangular configuration; said at least one stirrer member including a major axis and a minor axis, said major axis and said minor axis being of different dimensions.

5. An apparatus as recited in claim 4 wherein said stirrers in each said at least one pair are substantially identical to one another.

6. An apparatus as recited in claim 4 wherein said at least one pair of stirrers comprises at least one pair of stirrer members having their minor axes disposed at an angle of substantially 90° to one another.

7. An apparatus as recited in claim 1 additionally comprising means for cooling said stirring means.

8. An apparatus as recited in claim 7, wherein said stirring means comprises shafts made from mild steel piping and said means for cooling comprises a water cooling arrangement.

9. An apparatus as recited in claim 1 wherein said stirring means comprises at least one pair of stirrers extending below the bottom of said float canal into said conditioning zone.

10. A method of making glass in a float glass furnace comprising the steps of:
   (a) feeding a glass composition to said furnace;
   (b) melting said glass composition in a melting zone of said furnace to form molten glass;
   (c) transferring said molten glass from said melting zone to a refining zone of said furnace;
   (d) refining said molten glass in said refining zone to remove bubbles therefrom to form refined molten glass;
   (e) transferring said refined molten glass from said refining zone to a conditioning zone of said furnace;
   (f) cooling said refined molten glass in said conditioning zone to form cooled glass;
   (g) transferring said cooled glass from an exit from said conditioning zone to an entrance to a float canal having a narrower width than said conditioning zone and stirring said cooled glass with stirring means in the conditioning zone in the region of said exit from said conditioning zone such that all glass entering said float canal has improved homogeneity and is fully attenuated over its entire width of entry to said float canal.

11. A method as recited in claim 10, wherein said stirring is effected by at least one pair of driven, rotatable stirrers and wherein said stirrers in each said at least one pair are rotated in opposite senses of rotation to one another.

12. A method as recited in claim 11, wherein said stirrers in each said at least one pair are rotated 90° out of phase with one another.

13. A method as recited in claim 10 comprising the additional step of cooling each said stirring means.

14. A method as recited in claim 13 wherein said cooling of each said stirring means is effected by water-cooling.

15. A method which comprises:
   stirring conditioned molten glass in a conditioning zone; and
   supplying the stirred conditioned molten glass to a float canal;
   wherein said stirring occurs immediately upstream from said float canal and causes all glass supplied thereto to be fully attenuated across the entire width of said float canal.

16. A method as recited in claim 15 further comprising:
   refining a molten glass;
   transferring the refined molten glass to said conditioning zone; and
   conditioning the transferred molten glass to form said conditioned molten glass.

17. A method as recited in claim 15 wherein said stirring is effected by at least one pair of rectangular paddles and wherein said at least one pair of rectangular paddles are oppositely rotated 90° out of phase with one another.

18. A method as recited in claim 17 wherein said at least one pair of rectangular paddles extend into the conditioning zone to a level below the bottom of said float canal.

19. A method as recited in claim 17 wherein said at least one pair of rectangular paddles are rotated at a speed of 2 to 20 revolutions per minute.

20. A method as recited in claim 15 further comprising transferring the fully attenuated glass from said float canal to a float bath.

* * * * *